US010007791B2

United States Patent
Kramer et al.

(10) Patent No.: US 10,007,791 B2
(45) Date of Patent: Jun. 26, 2018

(54) SYSTEMS AND METHODS FOR INCREASING SECURITY SENSITIVITY BASED ON SOCIAL INFLUENCE

(71) Applicant: Facebook, Inc., Menlo Park, CA (US)

(72) Inventors: Adam Kramer, San Francisco, CA (US); Sauvik Das, Tucker, GA (US)

(73) Assignee: Facebook, Inc., Menlo Park, CA (US)

( * ) Notice: Subject to any disclaimer, the term of this patent is extended or adjusted under 35 U.S.C. 154(b) by 0 days. days.

(21) Appl. No.: 14/546,885

(22) Filed: Nov. 18, 2014

(65) Prior Publication Data

US 2016/0140341 A1   May 19, 2016

(51) Int. Cl.
*G06F 21/57* (2013.01)

(52) U.S. Cl.
CPC ............ *G06F 21/57* (2013.01); *G06F 21/577* (2013.01); *G06F 2221/034* (2013.01)

(58) Field of Classification Search
CPC .................. H04L 63/1433; H04L 63/1441
See application file for complete search history.

(56) References Cited

U.S. PATENT DOCUMENTS

| 2010/0257577 A1* | 10/2010 | Grandison | G06F 21/6245 726/1 |
| 2011/0029566 A1* | 2/2011 | Grandison | G06Q 10/10 707/783 |
| 2011/0314017 A1* | 12/2011 | Yariv | G06Q 30/02 707/737 |
| 2012/0117094 A1* | 5/2012 | Pratt | G06Q 10/06 707/758 |
| 2012/0331396 A1* | 12/2012 | Coletrane | G06Q 50/01 715/751 |
| 2013/0086254 A1* | 4/2013 | Bhola | H04L 63/168 709/224 |
| 2013/0340089 A1* | 12/2013 | Steinberg | H04L 63/10 726/27 |
| 2014/0089418 A1* | 3/2014 | Davenport | H04L 51/14 709/206 |
| 2014/0122473 A1* | 5/2014 | Fletcher | G06Q 10/101 707/732 |

(Continued)

OTHER PUBLICATIONS

Li et al., Semantics-Enhanced Privacy Recommendation for Social Networking Sites, Trust, Security and Privacy in Computing and Communications (TrustCom), 2011 IEEE 10th International Conference on, Jan. 2012 (Year: 2012).*

(Continued)

*Primary Examiner* — Luu T Pham
*Assistant Examiner* — Harvey I Cohen
(74) *Attorney, Agent, or Firm* — Sheppard Mullin Richter & Hampton LLP

(57) ABSTRACT

Systems, methods, and non-transitory computer-readable media can provide a set of security features capable of being enabled by a user associated with an online service. In some implementations, it can be determined that at least one security feature in the set has yet to be enabled by the user. A communication can be provided to the user. In some instances, the communication can indicate that a quantity of social connections associated with the user has already enabled the at least one security feature. One or more options to enable the at least one security feature can be provided to the user.

16 Claims, 10 Drawing Sheets

(56) References Cited

U.S. PATENT DOCUMENTS

| | | | | |
|---|---|---|---|---|
| 2014/0282870 A1* | 9/2014 | Markwordt | ............ | H04L 63/08 726/3 |
| 2014/0359013 A1* | 12/2014 | Morrison | ............ | H04L 63/104 709/204 |
| 2014/0359475 A1* | 12/2014 | Venkatesh | ............ | G06F 9/4443 715/747 |
| 2015/0019474 A1* | 1/2015 | Barbieri | ............ | G06Q 30/0201 706/53 |
| 2015/0039982 A1* | 2/2015 | Bastide | ............ | G06F 17/30864 715/205 |
| 2015/0047056 A1* | 2/2015 | Fabrikant | ............ | G06F 3/0482 726/28 |
| 2015/0310205 A1* | 10/2015 | Pruthi | ............ | G06F 21/46 726/25 |
| 2015/0381662 A1* | 12/2015 | Nair | ............ | H04L 63/205 726/1 |
| 2017/0155726 A1* | 6/2017 | Green | ............ | H04L 67/22 |

OTHER PUBLICATIONS

Shehab et al., ROAuth: recommendation based open authorization, ACM, ehab, Said Marouf, Christopher Hudel Jul. 2011 SOUPS '11: Proceedings of the Seventh Symposium on Usable Privacy and Security (Year: 2011).*

Sabbagh et al., Featuring Socio-Technical Cyber Security Warning Systems, Cyber Security, Cyber Warfare and Digital Forensic CyberSec), 2012 International Conference on, IEE, Jul. 2012 (Year: 2012).*

Anthonysamy et al., Collaborative privacy management for third-party applications in online social networks, ACM, PSOSM '12: Proceedings of the 1st Workshop on Privacy and Security in Online Social Media, Apr. 2012 (Year: 2012).*

* cited by examiner

SYSTEMS AND METHODS FOR INCREASING SECURITY SENSITIVITY BASED ON SOCIAL INFLUENCE

FIELD OF THE INVENTION

The present technology relates to the field of computer security. More particularly, the present technology relates to techniques for increasing security sensitivity based on social influence.

BACKGROUND

Today, people utilize computing devices (or systems) for various purposes. Users of computing devices can interact with one another, access content, share content, and create content. Users can use their computing devices, for example, to send messages to one another, browse web sites, access online resources, interact with social networks, and create media content, such as by taking pictures and recording videos. Users can sign or log into their accounts with various online services to accomplish a wide variety of tasks.

In some instances, users can be vulnerable to security threats, such as password phishing schemes, account hacks, and other breach of security incidents. Conventional approaches can provide security tools or features for users to protect themselves. However, in accordance with conventional approaches, users are often unaware of the availability of the security tools or features. Moreover, under conventional approaches, even if the users are aware of the availability of the security tools or features, they may lack the motivation, or may not feel the need, to adopt or enable the security tools or features. These and other concerns associated with conventional approaches can create challenges for or reduce the overall user experience associated with securely utilizing computing devices, computing systems, and/or online services.

SUMMARY

Various embodiments of the present disclosure can include systems, methods, and non-transitory computer-readable media configured to provide a set of security features capable of being enabled by a user associated with an online service. In some implementations, it can be determined that at least one security feature in the set has yet to be enabled by the user. A communication can be provided to the user. In some instances, the communication can indicate that a quantity of social connections associated with the user has already enabled the at least one security feature. One or more options to enable the at least one security feature can be provided to the user.

In an embodiment, a set of social connections associated with the user within the online service can be identified. In some implementations, it can be determined, for each respective social connection in the set of social connections, whether the respective social connection has already enabled the at least one security feature. In some instances, the quantity of social connections who have already enabled the at least one security feature can be calculated.

In an embodiment, the quantity of social connections can include at least one of an integer count of social connections or a percentage of social connections.

In an embodiment, the quantity of social connections can indicate a lower-bound amount of social connections.

In an embodiment, the quantity of social connections can indicate a limited amount of social connections.

In an embodiment, the quantity of social connections can indicate at least one of a numeric amount of social connections or a proportional amount of social connections.

In an embodiment, the quantity of social connections can indicate an ambiguous amount of social connections.

In an embodiment, the communication can provide an identifier for at least one social connection, associated with the user, who has already enabled the at least one security feature.

In an embodiment, the quantity of social connections can correspond to zero. In some instances, the communication can include a message suggesting that the user be first among all of the user's social connections to enable the at least one security feature.

In an embodiment, the quantity of social connections can correspond to all of the user's social connections. In some implementations, the communication can include a message informing the user that only the user, among all of the user's social connections, has yet to enable the at least one security feature.

In an embodiment, the communication can provide a social descriptor that describes at least one of the social connections, associated with the user, who has already enabled the at least one security feature.

In an embodiment, the social descriptor can provides information about the at least one of the social connections. In some implementations, the information can be associated with at least one of a location, a gender, a workplace, a job title, an educational institution, a residence, a hometown, a language, a group, or an organization.

In an embodiment, a security vulnerability can be determined for an account of the user at the online service.

In an embodiment, the communication can satisfy one or more privacy settings of the social connections, associated with the user, who have already enabled the at least one security feature.

In an embodiment, the one or more privacy settings can prevent security information associated with the social connections from being released in the communication to the user.

In an embodiment, the set of security features can include at least one of a login notification security feature, a login approval security feature, or a trusted contacts security feature.

It should be appreciated that many other security features, applications, embodiments, and/or variations of the disclosed technology will be apparent from the accompanying drawings and from the following detailed description. Additional and/or alternative implementations of the structures, systems, non-transitory computer-readable media, and methods described herein can be employed without departing from the principles of the disclosed technology.

Figure 1:
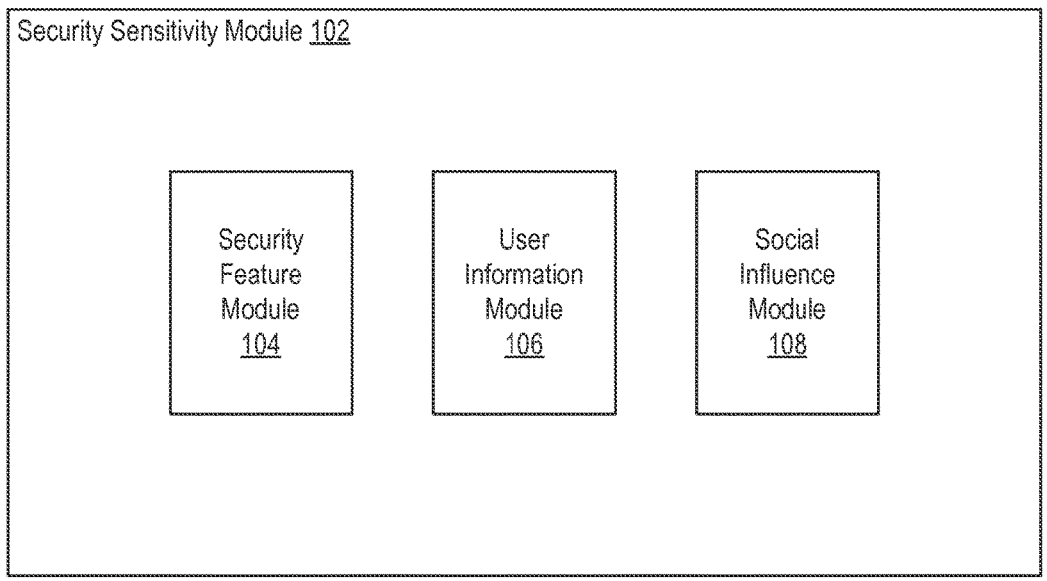
FIG. 1 illustrates an example security sensitivity module configured to facilitate increasing security sensitivity based on social influence, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Increasing Security Sensitivity Based on Social Influence

People use computing devices (or systems) for a wide variety of purposes. Computing devices can provide different kinds of functionality. Users can utilize their computing devices to produce information, access information, and share information. In some cases, users can use their computing devices to sign in or log in to a wide variety of online services. For example, a user can log in to his or her account with a social networking service (or system) and carry out various tasks via the social networking service.

In some instances, users of online services or resources can potentially face security threats or experience incidents of security breach. In one example, a user's social networking account can be hacked. In another example, the user can encounter a password phishing scheme that attempts to fraudulently or illegitimately obtain the user's password. In a further example, the user can receive a scam message attempting to obtain the user's financial information. Conversely, a user can forget his or her own password, thereby losing access to his or her account.

Conventional approaches generally provide one or more security features (or tools) to enable users to protect themselves. Conventional approaches can attempt to inform the users of the existence or availability of the security features. However, under conventional approaches, users may not pay attention to or be cognizant of the existence or availability of the security features. Moreover, users may believe that they would never encounter security threats, and thus would not recognize a need to adopt or enable the security features. Accordingly, with conventional approaches, users may possess an insignificant level of sensitivity (e.g., awareness, motivation, knowledge, etc.) with regard to security concerns. This can increase the likelihood that the user will be unprepared when security problems do arise for the users.

Therefore, an improved approach to providing security sensitivity can be beneficial for addressing or alleviating various concerns associated with conventional approaches. The disclosed technology relates to increasing security sensitivity based on social influence. Various embodiments of the present disclosure can provide a set of security features capable of being enabled by a user associated with an online service. In some implementations, it can be determined that at least one security feature in the set has yet to be enabled by the user. A communication can be provided to the user. In some instances, the communication can indicate that a quantity of social connections associated with the user has already enabled the at least one security feature. One or more options to enable the at least one security feature can be provided to the user. It is contemplated that there can be many variations and/or other possibilities.

It should also be noted that the disclosed technology avoids divulging private user information, settings, preferences, and/or other private information. In some embodiments, the communication provided to the user can satisfy one or more privacy settings of the social connections, associated with the user, who have already enabled the at least one security feature. In some implementations, the one or more privacy settings can prevent security information associated with the social connections from being released in the communication to the user. In some instances, users who use certain security features are never identified by the disclosed technology. Many other variations, embodiments, and/or implementations are possible.

FIG. 1 illustrates an example security sensitivity module 102 configured to facilitate increasing security sensitivity based on social influence, according to an embodiment of the present disclosure. As shown in the example of FIG. 1, the security sensitivity module 102 can include a security feature module 104, a user information module 106, and a social influence module 108. The components (e.g., modules, elements, etc.) shown in this figure and all figures herein are exemplary only, and other implementations may include additional, fewer, integrated, or different components. Some components may not be shown so as not to obscure relevant details.

In some embodiments, the security sensitivity module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware components, and/or any combination thereof. In some cases, the example security sensitivity module 102 can be implemented as software running on one or more computing devices or systems, such as on a user or client computing device. In one example, the security sensitivity module 102 can be implemented within a social networking system (or service), such as the social networking system 930 of FIG. 9. In another example, the security sensitivity module 102 is necessarily implemented within the social networking system. In a further example, the security sensitivity module 102 can be implemented as or with an application, a program, or an applet, etc., running on the user computing device or client computing system. It should be understood that many variations are possible.

The security feature module 104 can be configured to facilitate providing a set of security features capable of being enabled by a user associated with an online service.

For example, the security feature module 104 can make available a set of one or more security features (or tools) capable of being enabled, adopted, and/or installed by the user through the online service in order to allow the user to protect himself or herself (i.e., to protect his or her account with the online service) from various security threats. More details regarding the security feature module 104 will be provided with reference to FIG. 2.

The user information module 106 can be configured to facilitate determining that at least one security feature in the set has yet to be enabled by the user. For example, the user information module 106 can acquire information about the user's account with the online service. The information can indicate which security features (if any) have and have not been enabled (or adopted, installed, activated, etc.) by the user. A more detailed discussion relating to the user information module 106 will be provided below with reference to FIG. 3.

The social influence module 108 can be configured to facilitate providing a communication to the user indicating that a quantity of social connections associated with the user has already enabled the at least one security feature. For example, the social influence module 108 can communicate social cues, such as social proof, in attempt to influence the user to enable the at least one security feature. In general, social proof can refer to a psychological tendency for the user to look to other users for examples of how to act in uncertain circumstances. More details regarding the social influence module 108 will be provided with reference to FIG. 4.

Moreover, the security sensitivity module 102 can be configured to provide to the user one or more options to enable the at least one security feature. In some implementations, the security sensitivity module 102 can provide an interface that presents one or more buttons or interactive elements with which the user can interact (e.g., click, tap on, select, etc.), in order to cause the at least one security feature to be enabled.

Figure 2:
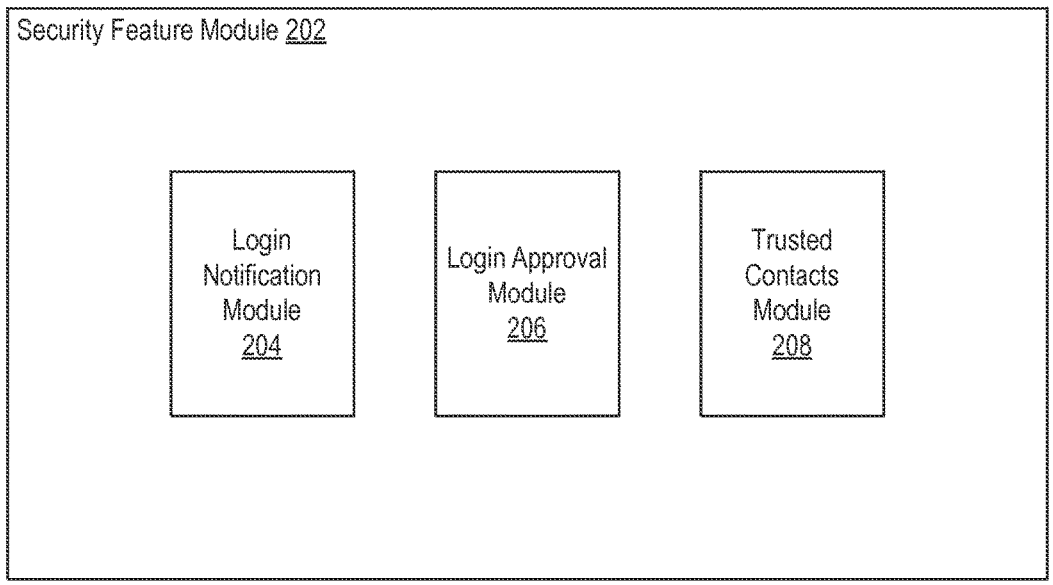
FIG. 2 illustrates an example security feature module configured to facilitate increasing security sensitivity based on social influence, according to an embodiment of the present disclosure.

FIG. 2 illustrates an example security feature module 202 configured to facilitate increasing security sensitivity based on social influence, according to an embodiment of the present disclosure. In some embodiments, the security feature module 104 can be implemented as the example security feature module 202. As shown in the example of FIG. 2, the security feature module 202 can include a login notification module 204, a login approval module 206, and a trusted contacts module 208.

As discussed previously, the security feature module 202 can be configured to facilitate providing the set of security features capable of being enabled by the user associated with the online service. The set of security features can correspond to a set of one or more security features. In some embodiments, the set of security features can include, but is not limited to, a login notification security feature, a login approval security feature, and/or a trusted contacts security feature, etc.

The login notification module 204 can be configured to provide the login notification security feature, which can be enabled by the user. In some cases, the login notification security feature can correspond to a security feature that informs the user whenever his or her account with the online service is accessed under suspicious circumstances. For example, the login notification feature can inform the user via text messaging, phone, and/or e-mail when the user's online service account is accessed from a previously unknown city and/or from an unrecognized Internet Protocol (IP) address. Many variations are possible.

The login approval module 206 can be configured to provide the login approval security feature, which is capable of being enabled by the user. The login approval security feature can require the user to input a security code, in addition to inputting the user's password, in order to successfully authenticate. For example, the login approval security feature can require the user to enter an alphanumeric code that is sent to a different physical computing device owned and pre-registered by the user (for example, a handheld device such as a smartphone), in addition to entering the user's password, in order to log in to the user's online service account. It is understood that there can be other possibilities.

The trusted contacts module 208 can be configured to provide the trusted contacts security feature, which can be enabled by the user. The trusted contacts security feature can require the user to specify a set of "trusted contacts," referring to social connections that the user trusts, who can vouch for the user's identity if he or she forgets his or her online service account credentials. For example, the trusted contacts security feature can require the user to identity three to five trustworthy social connections within the online service who can vouch for the user when the user forgets his or her username and/or password for the account at the online service. It should be appreciated that there can be many variations.

In some embodiments, there can be additional, fewer, or different modules included within the security feature module 202. It should be understood that many other security features (or tools, measures, processes, etc.) can be utilized within the scope of the present disclosure.

Figure 3:
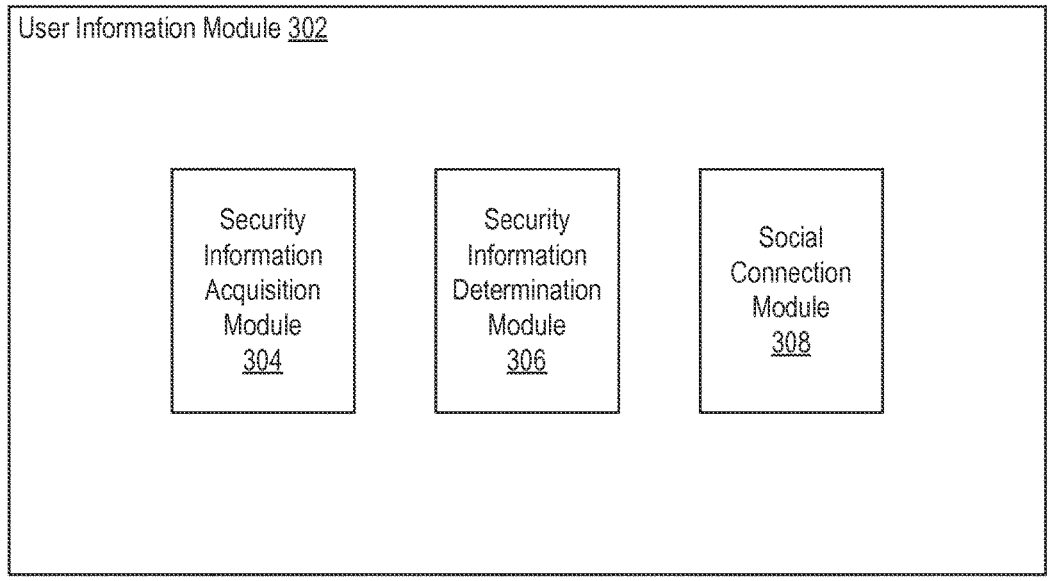
FIG. 3 illustrates an example user information module configured to facilitate increasing security sensitivity based on social influence, according to an embodiment of the present disclosure.

FIG. 3 illustrates an example user information module 302 configured to facilitate increasing security sensitivity based on social influence, according to an embodiment of the present disclosure. In some embodiments, the user information module 106 can be implemented as the example user information module 302. As shown in the example of FIG. 3, the user information module 302 can include a security information acquisition module 304, a security information determination module 306, and a social connection module 308.

The security information acquisition module 304 can be configured to facilitate acquiring security information associated with the user. The security information associated with the user can indicate which security features, if any, have been enabled by the user (i.e., by the user's account with the online service). From this, the security information determination module 306 can analyze the security information to determine which security features, if any, have yet to be enabled by the user.

As described above, a set of one or more security features capable of being enabled by the user can be provided to the user. In one example, the login notification security feature, the login approval security feature, and the trusted contacts security feature have been provided to the user. In this example, the security information acquisition module 304 can acquire security information associated with the user. The security information can indicate that the user has enabled the trusted contacts security feature and the login approval security feature. The security information determination module 306 can determine, based on the acquired security information, that the login notification security feature has not yet been enabled by the user. Accordingly, in this example, the disclosed technology can utilize social proof in attempt to influence the user to enable the login notification security feature. Utilizing social proof to influence the user to enable security features will be discussed in more detail with reference to FIG. 4.

In some implementations, the social connection module 308 can be configured to identify a set of social connections associated with the user within the online service. For example, the social connection module 308 can facilitate identifying all of the social connections or friends of the user within a social networking service or system.

Moreover, for each respective social connection in the set of social connections associated with the user, it can be determined whether the respective social connection has already enabled the at least one security feature or not. For example, the social connection module 308 can communicate or work in conjunction with the security information acquisition module 304 and/or the security information determination module 306 to determine whether each of the other users, who are socially connected to or friends with the user, have enabled the at least one security feature.

Furthermore, the social connection module 308 can facilitate calculating the quantity of social connections who have already enabled the at least one security feature. In some embodiments, based on determining whether each of the user's social connections or friends has enabled the at least one security feature, the quantity of social connections who have already enabled the at least one security feature can be calculated. For example, if one hundred of the user's friends or social connections have enabled the at least one security feature, then the quantity can correspond to "one hundred," "some," or "many." In another example, if one hundred, out of a total of two hundred friends of the user, have enabled the at least one security feature, then the quantity can additionally correspond to "50%." In a further example, if one hundred, out of a total of one hundred ten friends of the user, have enabled the at least one security feature, then the quantity can correspond to "the majority" or "most." In some embodiments, the quantity of social connections can be based additionally or alternatively on the strength of certain social connections with the user. For example, the quantity of social connections can reflect whether or to what extent social connections having a strong threshold affinity (e.g., threshold edge value) with the user have enabled the at least one security feature. In this case then the quality as well as the quantity may be cited. For example, if ten friends with strong threshold edge values have enabled the at least one security feature, the quantity could correspond to "most close friends." It is understood that many variations are possible.

Figure 4:
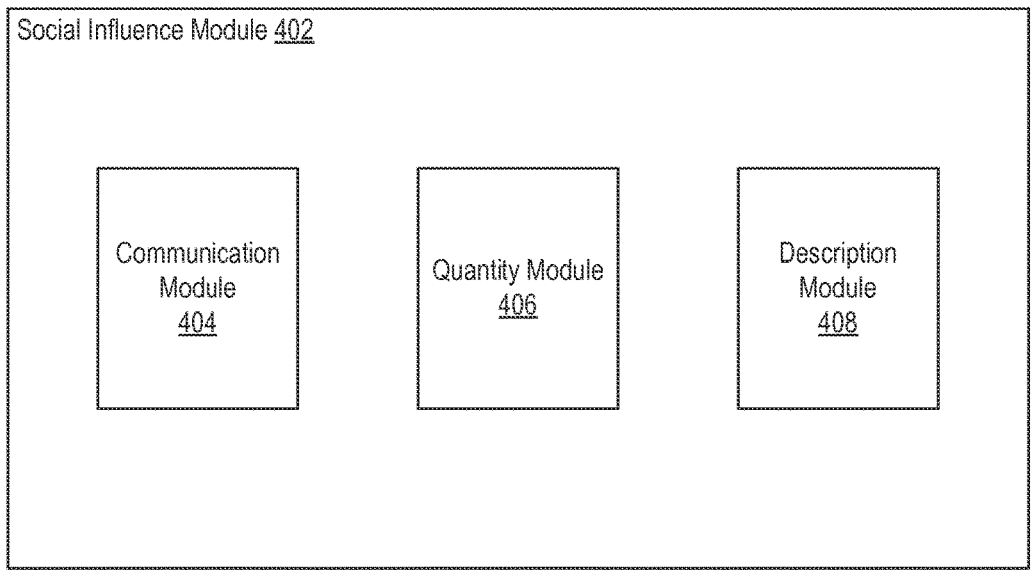
FIG. 4 illustrates an example social influence module configured to facilitate increasing security sensitivity based on social influence, according to an embodiment of the present disclosure.

FIG. 4 illustrates an example social influence module 402 configured to facilitate increasing security sensitivity based on social influence, according to an embodiment of the present disclosure. In some embodiments, the social influence module 108 can be implemented as the example social influence module 402. As shown in the example of FIG. 4, the social influence module 402 can include a communication module 404 and a quantity module 406. In some instances, the social influence module 402 can also include a description module 408.

The disclosed technology can provide an approach(es) to increasing an uptake, adoption, installation, and/or implementation of security features based on utilizing social influence. The disclosed technology utilizes a user's psychological tendency to make decisions influenced by words and/or actions of other users. In some instances, the disclosed technology can show the user that the user's friends are utilizing one or more particular security features. This can increase the likelihood that the user will pay attention to and/or ultimately adopt or enable the one or more particular security features.

In some cases, using social cues can be significantly more effective at raising awareness of security issues for users than using non-social cues. Moreover, since social cues cause more users to be aware of and to think about security issues, more users may ultimately enable security features. Accordingly, the communication module 404 can be configured to provide a communication to the user indicating that a quantity of social connections associated with the user has already enabled the at least one security feature. The quantity of social connections can be calculated or determined as discussed previously.

In the example of FIG. 4, the quantity module 406 can be configured to specify or instruct how or in what manner to provide (e.g., present, display, etc.) the quantity of social connections to the user. In some embodiments, the quantity of social connections can include at least one of an integer count of social connections or a percentage of social connections. In some embodiments, the quantity of social connections can include at least one of an integer count of social connections that have a threshold affinity (i.e., threshold edge value) with the user or a percentage of such social connections. Social connections that have a threshold affinity with the user may include good friends of the user, social connections which the user has high levels of interaction, family members, etc. Accordingly, in some instances, the quantity of social connections who have already enabled a particular security feature can be provided, presented, and/or displayed to the user as an integer value or as a percentage value. In some cases, the quantity of social connections can indicate a numeric amount of social connections. In one example, if five of the user's friends have enabled a particular security feature not yet enabled by the user, then the integer count of social connections who have enabled the particular security feature can correspond to five. In another example, if five out of the user's total twenty friends have enabled a particular security feature, then the percentage of social connections can correspond to "25%." In another example, if eight of the user's friends have enabled a particular security feature not yet enabled by the user, then the quantity of social connections can be provided (and/or presented, displayed, etc.) as "eight" or "8" of the user's friends. In a further example, if fifty out of the user's total one hundred friends have enabled a particular security feature, then the quantity of social connections can be provided as "50%" or "half" of the user's friends.

In some implementations, the quantity of social connections can indicate a lower-bound amount of social connections. For example, if ten of the user's friends have enabled a particular security feature not yet enabled by the user, then the lower-bound amount of social connections can be provided as "at least ten," "at least nine," or "over nine," etc., of the user's friends. In another example, if seventy out of the user's total two hundred friends have enabled a particular security feature, then the lower-bound amount of social connections can be provided as "at least 35%," "at least a third," or "over a third," etc., of the user's friends.

Moreover, in some instances, the quantity of social connections can indicate a limited amount of social connections. For example, the limited amount of social connections can be provided as "only six," "just six," or "less than seven," etc. In another example, the limited amount of social connections can be provided as "only 2%," "merely 3%," or "less than a tenth," etc.

Furthermore, in some embodiments, the quantity of social connections can indicate an ambiguous amount of social connections. For example, the ambiguous amount of social connections can be provided as "some," "many," "a significant number," or "most," etc., of the user's friends.

In some embodiments, the quantity of social connections can correspond to zero. The communication can include a message suggesting that the user be first among all of the user's social connections to enable a particular security feature. For example, the message can state, "None of your friends are using Security Feature X. Be the first to use security Feature X."

In some instances, the quantity of social connections can correspond to all of the user's social connections. The communication can include a message informing the user that only the user, among all of the user's social connections, has yet to enable a particular security feature. For example, the message can state, "All of your friends are using Security Feature Y. You are the only remaining one who is not using Security Feature Y."

In addition, the description module 408 can, in some cases, provide a social descriptor in the communication that describes at least one of the social connections, associated with the user, who has already enabled a particular security feature. The social descriptor can provide information about the at least one of the social connections, and the information can, for example, be associated with at least one of a location, a gender, a relationship, a workplace, a job title, an educational institution, a residence, a hometown, a language, a group, or an organization, etc. In one example, the communication can state, "80% of your friends from work are using Security Feature Z." In this example, the social descriptor can correspond to the phrase "from work."

In some implementations, the communication can provide an identifier for at least one social connection, associated with the user, who has already enabled a particular security feature. As such, in one example, the quantity of social connections can be provided as "John Doe, Jane Smith, and 108 of your friends." In this example, the identifier can correspond to a name of the user's social connection or friend. Likewise, in some implementations, the communication can provide an identifier for at least one social connection, with whom the user has a threshold connection strength, who has already enabled a particular security features as a "good friend", "active friend", etc. In some cases, however, users who use certain security features are not identified by the disclosed technology. For example, in such cases, based on various privacy or other settings, the disclosed technology can prevent the identities of users who enable certain security features from being released.

It should be appreciated that there can be many other variations, modifications, applications, and/or possibilities.

Furthermore, to reiterate, the communication provided to the user can satisfy one or more privacy settings of the social connections, associated with the user, who have already enabled a particular security feature. In some instances, the one or more privacy settings can prevent security information associated with the social connections from being released in the communication to the user. Again, the disclosed technology does not divulge private user information, settings, preferences, and/or other private information.

Figure 5:
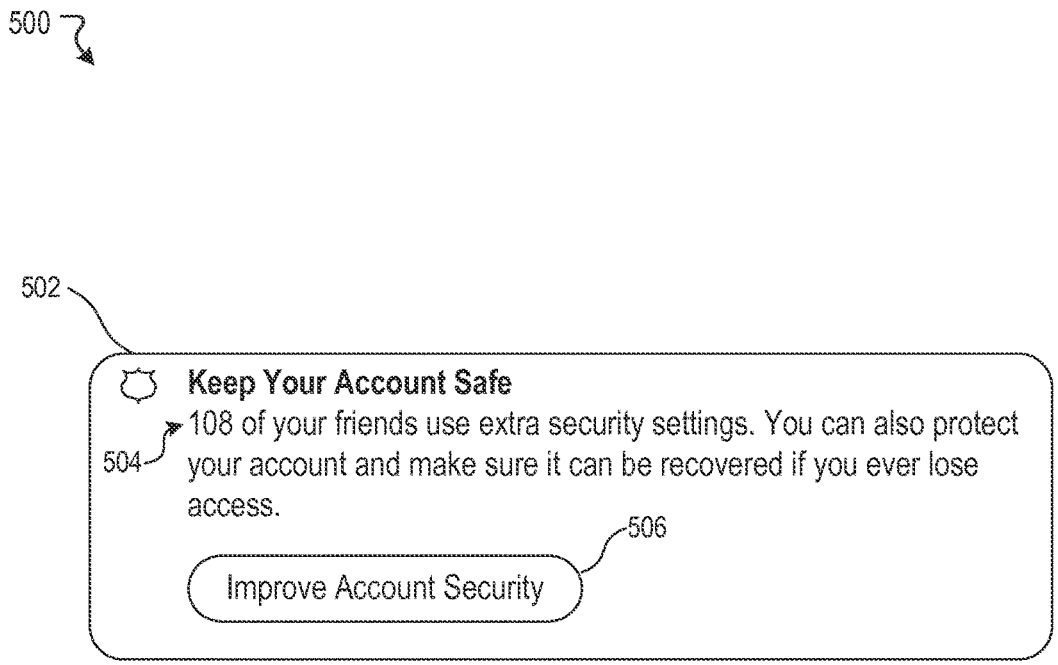
FIG. 5 illustrates an example scenario associated with increasing security sensitivity based on social influence, according to an embodiment of the present disclosure.

FIG. 5 illustrates an example scenario 500 associated with increasing security sensitivity based on social influence, according to an embodiment of the present disclosure. The scenario 500 illustrates an example communication 502 provided to a user. The communication 502 indicates that a quantity 504 (e.g., numeric integer count) of social connections associated with the user has already enabled at least one security feature, which has yet to be enabled by the user. Accordingly, the communication 502 utilizes social proof (e.g., the quantity 504 of social connections) to influence the user to enable the at least one security feature.

Moreover, as shown in the example scenario 500, one or more options 506 to enable the at least one security feature can be provided to the user. In this example, the one or more options 506 can be provided as a button or interactive element with which the user can interact (e.g., click, tap, press, etc.).

In some embodiments, the communication 502 can be provided, presented, displayed, and/or rendered at a social networking system or service. For example, the communication 502 can be provided within a newsfeed, profile, timeline, page, event, etc., that is accessible to the user.

Figure 6:
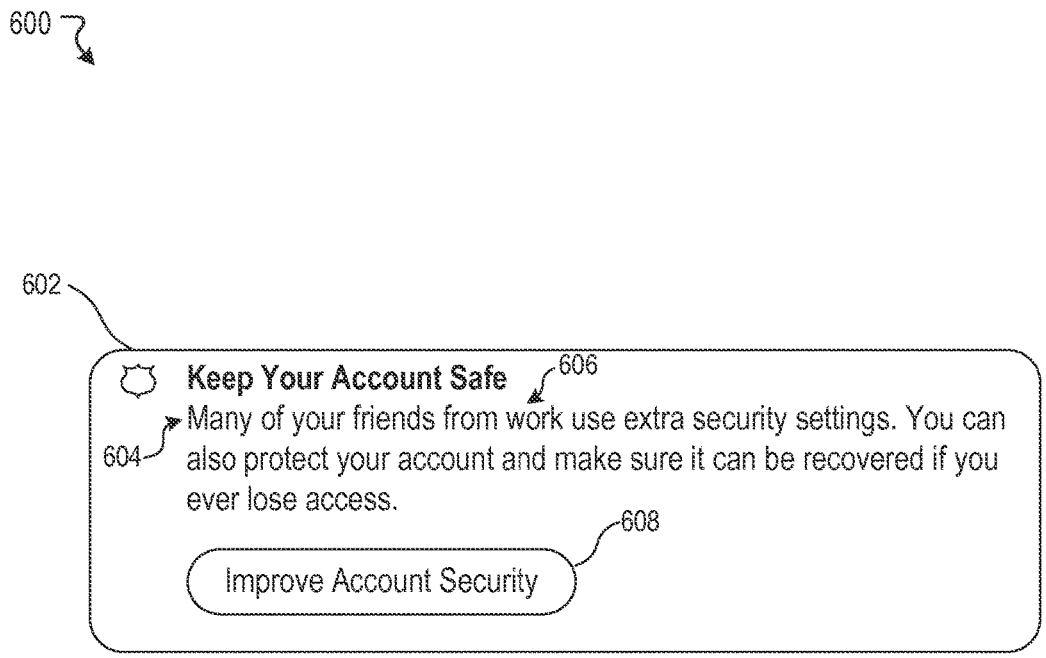
FIG. 6 illustrates an example scenario associated with increasing security sensitivity based on social influence, according to an embodiment of the present disclosure.

FIG. 6 illustrates an example scenario 600 associated with increasing security sensitivity based on social influence, according to an embodiment of the present disclosure. The scenario 600 illustrates an example communication 602 provided to a user. The communication 602 indicates that a quantity 604 (e.g., ambiguous amount) of social connections associated with the user has already enabled at least one security feature, which has yet to be enabled by the user. Accordingly, the communication 602 utilizes social proof (e.g., the quantity 604 of social connections) to influence the user to enable the at least one security feature.

Moreover, as shown in the example scenario 600, a social descriptor 606 can be utilized to provide information about the social connections. Furthermore, one or more options 608 to enable the at least one security feature can be provided to the user.

Figure 7:
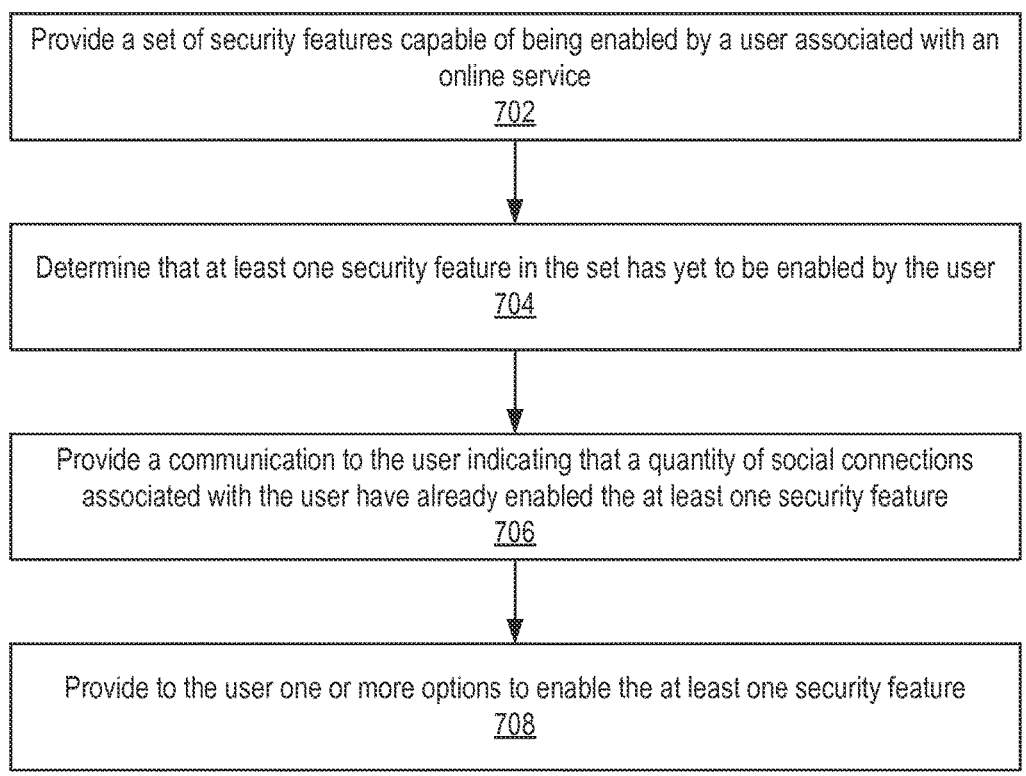
FIG. 7 illustrates an example method associated with increasing security sensitivity based on social influence, according to an embodiment of the present disclosure.

FIG. 7 illustrates an example method 700 associated with increasing security sensitivity based on social influence, according to an embodiment of the present disclosure. It should be appreciated that there can be additional, fewer, or alternative steps performed in similar or alternative orders, or in parallel, within the scope of the various embodiments unless otherwise stated.

At block 702, the example method 700 can provide a set of security features capable of being enabled by a user associated with an online service. At block 704, the example method 700 can determine that at least one security feature in the set has yet to be enabled by the user. At block 706, the example method 700 can provide a communication to the user indicating that a quantity of social connections associated with the user has already enabled the at least one security feature. At block 708, the example method 700 can provide to the user one or more options to enable the at least one security feature.

Figure 8:
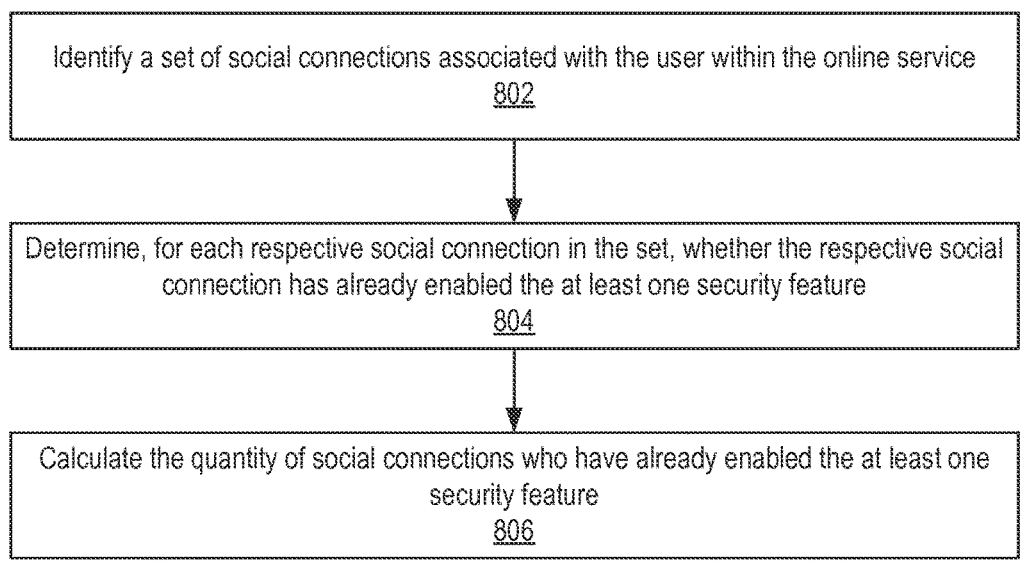
FIG. 8 illustrates an example method associated with increasing security sensitivity based on social influence, according to an embodiment of the present disclosure.

FIG. 8 illustrates an example method 800 associated with increasing security sensitivity based on social influence, according to an embodiment of the present disclosure. Again, it should be appreciated that there can be additional, fewer, or alternative steps performed in similar or alternative orders, or in parallel, within the scope of the various embodiments unless otherwise stated.

At block 802, the example method 800 can identify a set of social connections associated with the user within the online service. At block 804, the example method 800 can determine, for each respective social connection in the set of social connections, whether the respective social connection has already enabled the at least one security feature. At block 806, the example method 800 can calculate the quantity of social connections who have already enabled the at least one security feature.

Again, in some cases, users who use certain security features are not identified by the disclosed technology. For example, in such cases, based on various privacy or other settings, the disclosed technology can prevent the identities of users who enable certain security features from being released. In some embodiments, a security vulnerability can be determined for an account of the user at the online service. For example, particular user accounts can be identified as being more susceptible to security threats. Therefore, in some cases, these particular user accounts can be provided with social influence more frequently than other user accounts that are not as vulnerable.

In some implementations, a feedback loop can be utilized to refine, modify, and/or improve various embodiments over time. For example, if feedback indicates that providing ambiguous amounts of social connections to the user performs poorly, then an integer count or percentage of social connections can be provided to the user instead.

Again, it is contemplated that there can be many other uses, applications, and/or variations associated with the various embodiments of the present disclosure. For example, various embodiments of the present disclosure can learn, improve, and/or be refined over time.

Social Networking System—Example Implementation

Figure 9:
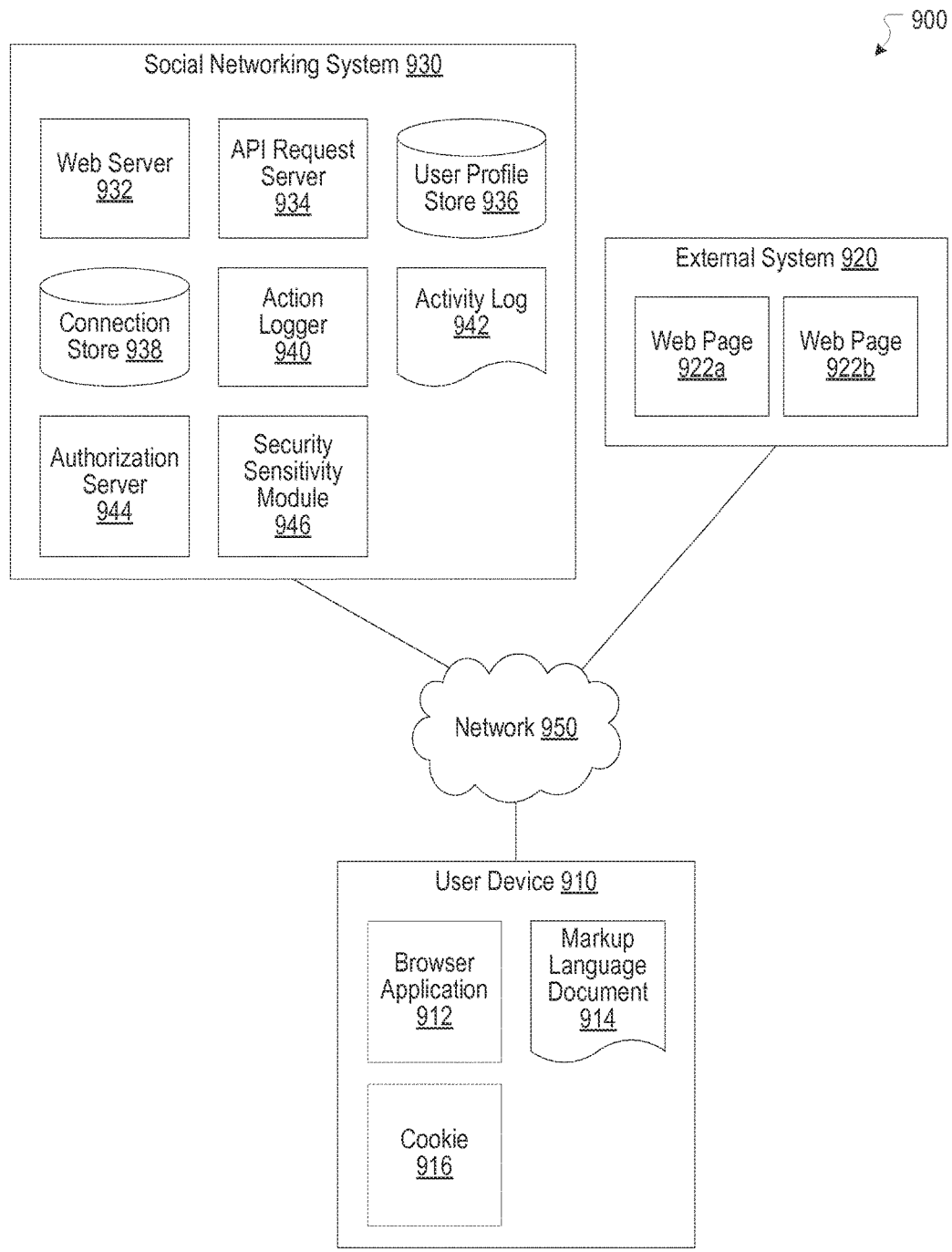
FIG. 9 illustrates a network diagram of an example system that can be utilized in various scenarios, according to an embodiment of the present disclosure.

FIG. 9 illustrates a network diagram of an example system 900 that can be utilized in various scenarios, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922*a*, 922*b*, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922*a* within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include a security sensitivity module 946. The security sensitivity module 946 can, for example, be implemented as the security sensitivity module 102 of FIG. 1. The security sensitivity module 946 can be configured to provide a set of security features capable of being enabled by a user associated with an online service. The security sensitivity module 946 can be configured to determine that at least one security feature in the set has yet to be enabled by the user. Further, the security sensitivity module 946 can be configured to provide a communication to the user indicating that a quantity of social connections associated with the user has already enabled the at least one security feature. The security sensitivity module 946 can also be configured to provide to the user one or more options to enable the at least one security feature. Other features of the security sensitivity module 946 are discussed herein in connection with the security sensitivity module 102.

Hardware Implementation

Figure 10:
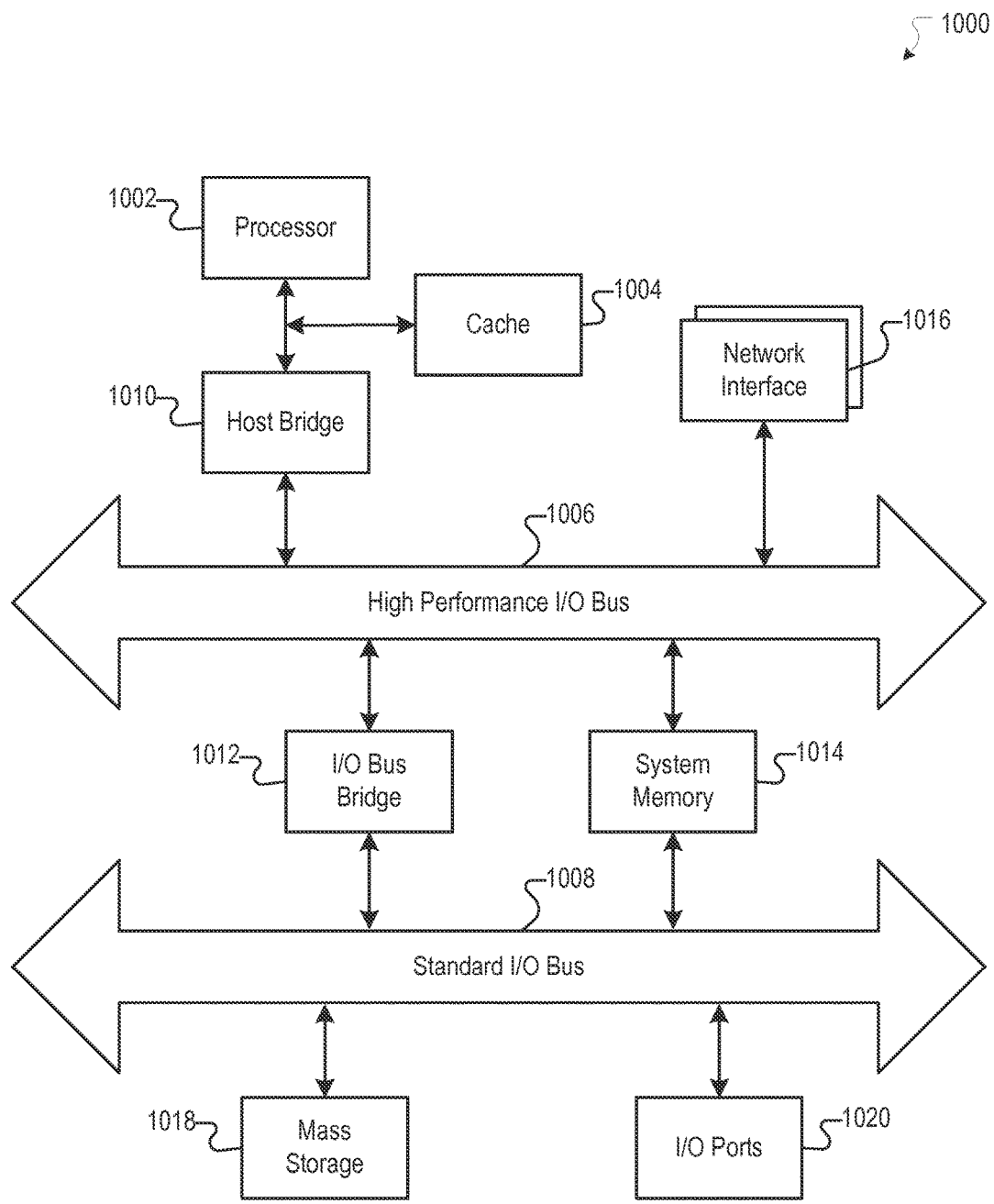
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 1020, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer-readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   providing, by a computing system, a set of security features associated with protection of online accounts of users of a social networking service, and capable of being enabled by the users;
   determining, by the computing system, that at least one security feature in the set has yet to be enabled by a user;
   determining, by the computing system, for each respective social connection in a set of social connections associated with the user within the social networking system, whether the respective social connection has already enabled the at least one security feature, wherein the at least one security feature includes at least one of a login notification security feature, a login approval security feature, and a trusted contacts security feature;
   calculating, by the computing system, a quantity of social connections who have already enabled the at least one security feature;
   providing, by the computing system, a communication to the user indicating that the quantity of social connections associated with the user has already enabled the at least one security feature, wherein the quantity of social connections is identified in the communication to the user indicating that the quantity of social connections associated with the user has already enabled the at least one security feature; and
   providing, by the computing system, to the user one or more options to enable the at least one security feature.

2. The computer-implemented method of claim 1, wherein the quantity of social connections includes at least one of an integer count of social connections or a percentage of social connections.

3. The computer-implemented method of claim 2, wherein the quantity of social connections indicates a lower-bound amount of social connections.

4. The computer-implemented method of claim 2, wherein the quantity of social connections indicates a limited amount of social connections.

5. The computer-implemented method of claim 2, wherein the quantity of social connections indicates at least one of a numeric amount of social connections or a proportional amount of social connections.

6. The computer-implemented method of claim 1, wherein the quantity of social connections indicates an ambiguous amount of social connections.

7. The computer-implemented method of claim 1, wherein the communication provides an identifier for at least one social connection, associated with the user, who has already enabled the at least one security feature.

8. The computer-implemented method of claim 1, wherein the quantity of social connections corresponds to zero, and wherein the communication includes a message suggesting that the user be first among all of the user's social connections to enable the at least one security feature.

9. The computer-implemented method of claim 1, wherein the quantity of social connections corresponds to all of the user's social connections, and wherein the communication includes a message informing the user that only the user, among all of the user's social connections, has yet to enable the at least one security feature.

10. The computer-implemented method of claim 1, wherein the communication provides a social descriptor that describes at least one of the social connections, associated with the user, who has already enabled the at least one security feature.

11. The computer-implemented method of claim 10, wherein the social descriptor provides information about the at least one of the social connections, and wherein the information is associated with at least one of a location, a gender, a workplace, a job title, an educational institution, a residence, a hometown, a language, a group, or an organization.

12. The computer-implemented method of claim 1, further comprising:
    determining a security vulnerability for an account of the user at the social networking service.

13. The computer-implemented method of claim 1, wherein the communication satisfies one or more privacy settings of the social connections, associated with the user, who have already enabled the at least one security feature.

14. The computer-implemented method of claim 13, wherein the one or more privacy settings prevent security information associated with the social connections from being released in the communication to the user.

15. A system comprising:
    at least one processor; and
    a memory storing instructions that, when executed by the at least one processor, cause the system to perform:
       providing a set of security features associated with protection of online accounts of users of a social networking service, and capable of being enabled by the users;
       determining that at least one security feature in the set has yet to be enabled by a user;

determining for each respective social connection in a set of social connections associated with the user within the social networking system, whether the respective social connection has already enabled the at least one security feature, wherein the at least one security feature includes at least one of a login notification security feature, a login approval security feature, and a trusted contacts security feature;

calculating a quantity of social connections who have already enabled the at least one security feature;

providing a communication to the user indicating that the quantity of social connections associated with the user has already enabled the at least one security feature, wherein the quantity of social connections is identified in the communication to the user indicating that the quantity of social connections associated with the user has already enabled the at least one security feature; and providing to the user one or more options to enable the at least one security feature.

16. A non-transitory computer-readable storage medium including instructions that, when executed by at least one processor of a computing system, cause the computing system to perform:

providing a set of security features associated with protection of online accounts of users of a social networking service, and capable of being enabled by the users;

determining that at least one security feature in the set has yet to be enabled by a user;

determining for each respective social connection in a set of social connections associated with the user within the social networking system, whether the respective social connection has already enabled the at least one security feature, wherein the at least one security feature includes at least one of a login notification security feature, a login approval security feature, and a trusted contacts security feature;

calculating a quantity of social connections who have already enabled the at least one security feature;

providing a communication to the user indicating that the quantity of social connections associated with the user has already enabled the at least one security feature, wherein the quantity of social connections is identified in the communication to the user indicating that the quantity of social connections associated with the user has already enabled the at least one security feature; and providing to the user one or more options to enable the at least one security feature.

\* \* \* \* \*